United States Patent [19]
Kesten

[11] Patent Number: 5,347,828
[45] Date of Patent: Sep. 20, 1994

[54] ORGANIC HYDRIDE/METAL HYDRIDE HEAT PUMP

[75] Inventor: Arthur S. Kesten, West Hartford, Conn.

[73] Assignee: United Technologies Corporation, Hartford, Conn.

[21] Appl. No.: 83,824

[22] Filed: Jun. 25, 1993

Related U.S. Application Data

[63] Continuation-in-part of Ser. No. 35,811, Mar. 23, 1993, abandoned.

[51] Int. Cl.$^5$ .............. F25B 17/00; F17C 11/00; F28D 15/00
[52] U.S. Cl. .................... 62/46.2; 62/467; 62/480; 165/104.12
[58] Field of Search ............ 62/46.2, 4, 467, 480; 165/104.12

[56] References Cited

U.S. PATENT DOCUMENTS

| | | | |
|---|---|---|---|
| 4,055,962 | 11/1977 | Terry | 62/102 |
| 4,161,211 | 7/1979 | Duffy et al. | 165/1 |
| 4,214,699 | 7/1980 | Buchner et al. | 237/12.3 C |
| 4,346,752 | 8/1982 | Kesten et al. | 165/1 |
| 4,385,726 | 5/1983 | Bernauer et al. | 237/12.3 |
| 4,436,539 | 3/1984 | Ron et al. | 62/4 |
| 4,476,918 | 10/1984 | Kesten | 165/1 |
| 4,478,814 | 10/1984 | Kesten et al. | 423/650 |
| 4,540,043 | 9/1985 | Miura | 165/104.12 |
| 4,567,033 | 1/1986 | Kesten | 423/648 R |
| 4,614,176 | 9/1986 | Kesten | 126/110 R |
| 4,712,610 | 12/1987 | Kesten et al. | 165/104.12 |
| 4,742,868 | 5/1988 | Mitani et al. | 165/104.12 |
| 4,754,805 | 7/1988 | Rothmeyer | 165/1 |
| 4,784,217 | 11/1988 | Payre et al. | 165/104.12 |
| 4,823,864 | 4/1989 | Rockenfeller | 165/104.12 |
| 4,829,772 | 5/1989 | Bogdanovi et al. | 62/48.1 |
| 4,850,859 | 7/1989 | Kesten et al. | 431/328 |
| 4,928,496 | 5/1990 | Wallace et al. | 62/46.2 |
| 4,949,549 | 8/1990 | Steidl et al. | 62/101 |
| 4,976,117 | 12/1990 | Crozat et al. | 62/480 |
| 4,993,239 | 2/1991 | Steidl et al. | 62/480 |
| 5,018,368 | 5/1991 | Steidl et al. | 62/480 |
| 5,056,591 | 10/1991 | Spinner et al. | 165/104.16 |
| 5,127,470 | 7/1992 | Inaba et al. | 165/104.12 |

FOREIGN PATENT DOCUMENTS 1146725 5/1983 Canada .
(List continued on next page.)

OTHER PUBLICATIONS

International Journal of Energy Research, vol. 11, 1987, Chichester, pp. 519-529; G. Cacciola et al. "Chemical Heat Pump using Heat of Reversible Catalytic Rections".

(List continued on next page.)

*Primary Examiner*—Henry A. Bennet
*Assistant Examiner*—Christopher Kilner
*Attorney, Agent, or Firm*—George J. Romanik

[57] ABSTRACT

A heat pump that includes organic hydride (12) and metal hydride (2) systems cools a conditioned space (6) by transferring heat from the conditioned space to a metal hydride bed (4), thereby decomposing a metal hydride in the bed to form $H_2$. The $H_2$ flows to a vapor space (14) in the liquid hydride system (12) and reacts with a dehydrogenation product at a catalytic surface (32) in the vapor space to form an organic hydride and an exothermic heat of reaction. The heat pump also may be used to upgrade waste heat by transferring heat from a relatively low temperature heat source to decompose the metal hydride. The exothermic heat of reaction may then be removed from the vapor space and used for space heating. In both embodiments, the metal hydride bed (4) may be regenerated by supplying an endothermic heat of reaction to the catalytic surface (32), thereby dehydrogenating the organic hydride to form $H_2$. The $H_2$ flows to the metal hydride bed (4) and reacts with the metal hydride bed to regenerate the metal hydride. Alternately, the metal hydride bed (4) may be regenerated by flowing a liquid mixture that includes the organic hydride into a reaction zone (38) having a dehydrogenation catalyst (42) and supplying an endothermic heat of reaction to the reaction zone, thereby dehydrogenating the organic hydride to form $H_2$. As before, the $H_2$ flows to the metal hydride bed (4) where it regenerates the metal hydride.

31 Claims, 3 Drawing Sheets

FOREIGN PATENT DOCUMENTS

| | | |
|---|---|---|
| 2629441 | 1/1978 | Fed. Rep. of Germany . |
| 2-101355 | 4/1990 | Japan . |
| 2-130360 | 5/1990 | Japan . |
| 2-259374 | 10/1990 | Japan . |
| 2-259375 | 10/1990 | Japan . |
| 428973 | 1/1992 | Japan . |
| 2157415 | 10/1985 | United Kingdom . |

OTHER PUBLICATIONS

International Journal of Hydrogen Energy, vol. 9, No. 5, 1984, Oxford GB, pp. 411–419; G. Cacciola et al. "Cyclohexane as a Liquid Phase Carrier in Hydrogen Storage and Transport".

International Search Report for PCT/US93/12106, mailed 13 Apr. 1994; for the PCT application that corresponds to United States Application 08/083,824 (the present application).

Y Saito, M. Yamashita, and E. Ito, "Hydrogen Production From 2-Propanol as a Key Reaction For Chemical Heat Pump With Reaction Couple of 2-Propanol Dehydrogenation/Acetone Hydrogenation", *Hydrogen Energy Progress VIII*, Proc. 8th World Hydrogen Energy Conference (Jul. 1990, Honolulu), Pergamon Press vol. 1, 338–45.

M. Yamashita, F. Dai, M. Suzuki and Y. Saito, "Mechanism of 2-Propanol Dehydrogenation With Suspended Nickel Fine–Particle Catalyst", *Bull. Chem. Soc. Japan*, vol. 64, No. 2, pp. 628–634 (1991).

E. Ito, M. Yamashita, S. Hagiwara, and Y. Saito, "A Composite Ru–Pt Catalyst for 2-Propanol Dehydrogenation Adoptable to the Chemcial Heat Pump System", *Chemistry Letters*, pp. 351–354 (1991).

H. Buchner, "Hydrogen Use–Transportation Fuel" *Brit. J. Hydrogen Energy*, vol. 9, No. 6, pp. 501–514 (1984).

M. Yamashita, T. Kawamura, M. Suzuki and Y. Saito, "Charteristics of Suspended Ru/Carbon Catalyst for 2-Propanol Dehydrogenation Applicable to Chemical Heat Pump", *Bull. Chem. Soc. Japan*, vol. 64, No. 1, pp. 272–278 (1991).

Y. Saito, M. Yamashita, K. Yukawa and H. Itagaki, "Chemical Conversion of Thermal Energy Using Liquid–Phase Dehydrogenation of 2-Propanol of Cyclohexanes", Department of Industrial Chemistry, Faculty of Engineering, University of Tokyo, Bunkyo–ku, Tokyo, Japan, pp. 113–121.

M. Yamashita, E. Ito, and Y. Saito, "Liquid–Phase Dehydrogenation of 2-Propanol as the Key Reaction for 2-Propanol/Acetone/Hydrogen Chemical Heat Pump System", Department of Industrial Chemistry, Faculty of Engineering. University of Tokyo, Bunkyo–ku, Tokyo, Japan, pp. 197–205.

ORGANIC HYDRIDE/METAL HYDRIDE HEAT PUMP

This application is a continuation-in-part of copending U.S. application No. 08/035,811, filed Mar. 23, 1993, abandoned.

TECHNICAL FIELD

The present invention is directed to a heat pump, particularly a compressor-less, chlorofluorocarbon-free heat pump.

BACKGROUND ART

Heat pumps and related devices have long been used for heating, air conditioning, refrigeration, and other heat transfer applications. Typically, such devices operate by transferring heat from a heat source, such as a source of waste heat or a conditioned space, to a liquid working fluid, thereby boiling the working fluid. The gaseous working fluid is then compressed, condensed to a liquid, and recycled to absorb additional heat from the conditioned space. The heat given up by the working fluid when it is condensed can be used for space heating, some other useful purpose, or can be rejected to the surroundings. While this cycle is widely used, drawbacks include the need for a compressor and the common use of chlorofluorocarbons as a working fluid. The compressor creates noise and includes moving parts that are subject to wear and failure. Chlorofluorocarbons are the subject of an international agreement that restricts their use in the future. In addition, prior art systems can limit the extent to which relatively low temperature waste heat (e.g., 35° C. to 95° C.) can be used to provide space heating.

As the industry strives to improve the reliability and performance of heat pumps and related devices such as air conditioners, reducing the noise produced by the compressor and eliminating the use of chlorofluorocarbons as working fluids are important goals. In achieving these goals, it also would be desirable to dispense with the compressor entirely. To date, however, these goals have been difficult to achieve. As a result, there remains a need for heat pumps that can be used to upgrade low grade waste heat, do not need a compressor, and do not use chlorofluorocarbons as a working fluid.

DISCLOSURE OF THE INVENTION

The present invention is directed to a compressorless, chlorofluorocarbon-free heat pump and methods for cooling and heating that use the heat pump.

One embodiment of the invention includes a heat pump having an organic hydride system and a metal hydride system. The organic hydride system includes a vessel with a liquid space and a vapor space and a catalytic surface disposed in the vapor space. The catalytic surface promotes hydrogenation of an organic dehydrogenation product to form an organic hydride and dehydrogenation of the organic hydride to form $H_2$. The organic hydride system also includes means for cooling the catalytic surface when it promotes hydrogenation and means for heating the catalytic surface when it promotes dehydrogenation. The metal hydride system includes a metal hydride bed and means for transferring heat from a heat source to the metal hydride bed. A duct connects the vapor space of the organic hydride system with the metal hydride system.

Another embodiment of the invention includes another heat pump having an organic hydride system and a metal hydride system. The organic hydride system includes a vessel with a liquid space and a vapor space, a catalytic surface disposed in the vapor space, a liquid-phase reaction zone in fluid communication with the liquid space, and a dehydrogenation catalyst disposed in the reaction zone. The catalytic surface promotes hydrogenation of an organic dehydrogenation product to form an organic hydride and the dehydrogenation catalyst promotes dehydrogenation of the organic hydride to form $H_2$. The organic hydride system also includes means for cooling the catalytic surface when it promotes hydrogenation, means for providing an endothermic heat of reaction to the reaction zone, and means for transporting $H_2$ from the reaction zone to the vapor space. The metal hydride system and duct are as described above.

Another embodiment of the invention includes a method of transferring heat from a heat source with a heat pump that includes a metal hydride system and an organic hydride system. When operating the device in a primary mode, heat is transferred from the heat source to a metal hydride bed, thereby cooling the heat source and decomposing a metal hydride in the bed to form $H_2$. The $H_2$ flows to a vapor space in the liquid hydride system and reacts with a dehydrogenation product at a catalytic surface in the vapor space to form an organic hydride and an exothermic heat of reaction.

The device may be operated in a regeneration mode by supplying an endothermic heat of reaction to the catalytic surface, thereby dehydrogenating the organic hydride to form $H_2$. The $H_2$ flows to the metal hydride bed and reacts with the metal hydride bed to regenerate the metal hydride and produce an exothermic heat of reaction.

Alternately, the metal hydride may be regenerated by flowing a liquid mixture that includes the organic hydride into a reaction zone having a dehydrogenation catalyst. An endothermic heat of reaction is supplied to the reaction zone to dehydrogenate the organic hydride to form $H_2$. The $H_2$ flows to the metal hydride bed where it regenerates the metal hydride.

These and other features and advantages of the present invention will become more apparent from the following description and accompanying drawing.

BEST MODE FOR CARRYING OUT THE INVENTION

Depending on its design and the application for which it is used, the heat pump of the present invention can be used either as a cooling device, a heating device, or both. In some applications, it may be desirable to optimize the heat pump as either a cooling or heating device. In other applications, however, the heat pump may be designed as a duel use device.

Figure 1:
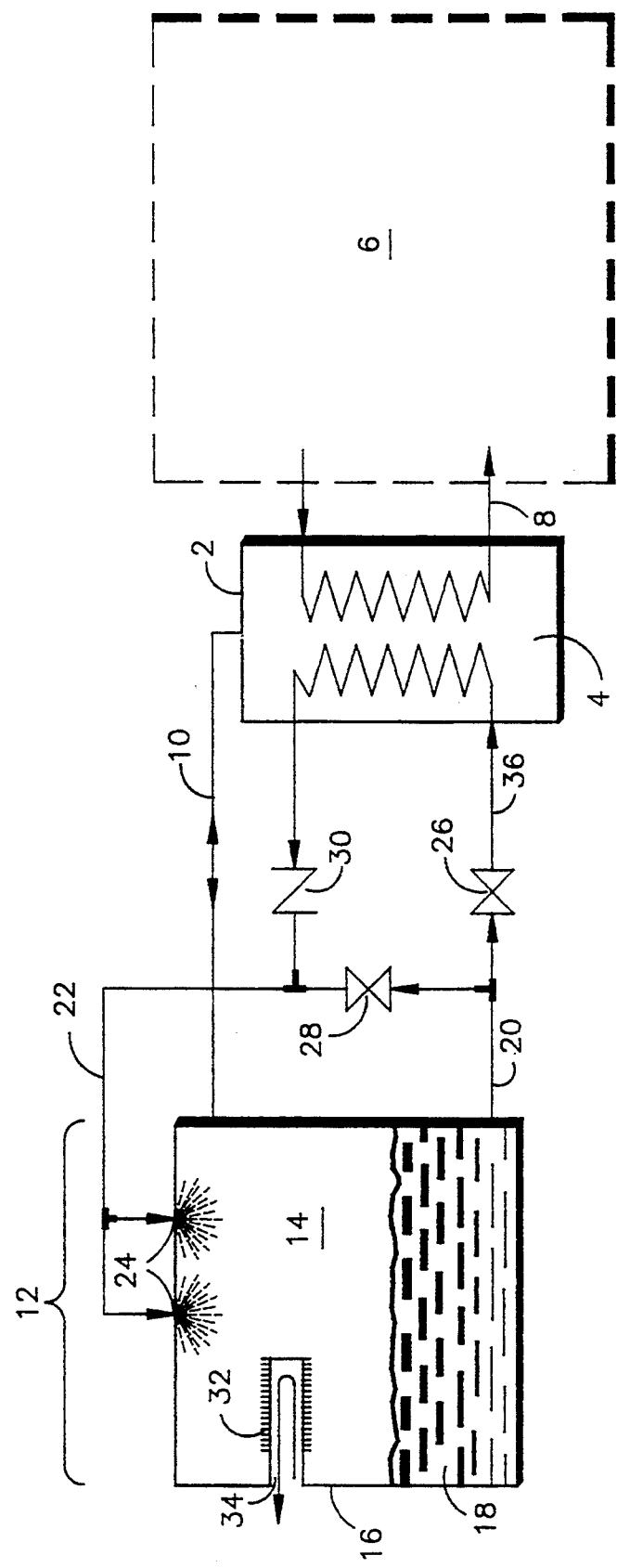
FIG. 1 is a process flow diagram of a heat pump of the present invention configured as a cooling device.

FIG. 1 shows one embodiment of the present invention that combines a metal hydride system 2 with an organic hydride system 12. The metal hydride system 2 comprises a metal hydride bed 4 that includes a metal hydride. The metal hydride may be any metal hydride that endothermically dissociates to form $H_2$ at atmospheric pressure and a temperature above about 10° C. Preferably, the metal hydride will dissociate at a temperature above about 20° C. Suitable metal hydrides include $LaNi_5H$, $LaNi_{4.7}Al_{0.3}H_3$, $CaNi_5H$, $Mg_2NiH_4$, $Fe_{0.8}Ni_{0.2}TiH_{0.6}$, $MgH_2$, $FeTiH$, $Fe_{0.9}Mn_{0.1}TiH$, $Ti_{0.98}Zr_{0.02}V_{0.45}Fe_{0.10}Cr_{0.05}Mn_{1.5}$ hydride and other metal hydrides known in the art. Suitable materials and related storage tanks and systems can be purchased from companies such as INCO (New York, N.Y.), INCO's subsidiary MPD (Birmingham, Great Britain), Billings Corporation (Independence, Mo.), the Gesellschaft for Elektrometallurgie (Nuremberg, Germany), Thyssen AG (Essen, Germany), and Mannesmann AG (Düsseldorf, Germany).

During a primary mode, heat from a heat source 6, such as a conditioned space, is transferred to the metal hydride bed 4. The metal hydride absorbs the heat and dissociates to form $H_2$. Withdrawing heat from the heat source 6 cools it. Any conventional means for transferring heat 8 may be used to transfer heat to the metal hydride bed 4. For example, if the heat source 6 is a conditioned space, air from the conditioned space may be circulated through the bed 4. Alternately, a conventional heat transfer fluid may be used to transfer the heat.

Producing $H_2$ in the metal hydride bed 4 creates pressure and concentration differentials between the metal hydride bed and the organic hydride system 12. As a result of the pressure and concentration differentials, the $H_2$ flows through a duct 10 to the organic hydride system 12 where it reacts with a dehydrogenation product to form a corresponding organic hydride. The organic hydride may be any hydrocarbon or alcohol that can be dehydrogenated to form $H_2$ and at least one dehydrogenation product. Preferably, the organic hydride will have one to 14 carbon atoms. Suitable organic hydrides include normal alkanes such as pentane, heptane, and decane, cycloalkanes such as cyclohexane, methylcyclohexane, and decalin, and alcohols such as methanol, ethanol, and propanol. If desired, the organic hydride may be a blend of two or more hydrocarbon or alcohol species. Preferably, both the organic hydride and the dehydrogenation product will be liquids at room temperature and atmospheric pressure so they are easy to handle. Most preferably, the organic hydride will have a single, predominant dehydrogenation product. Methylcyclohexane ($C_7H_{14}$) and 2-propanol (($CH_3)_2CHOH$) are preferred organic hydrides because they are liquids at room temperature and atmospheric pressure and dehydrogenate to $H_2$ and a predominant dehydrogenation product with minimal formation of side products. As shown by equations (1) and (2), methylcyclohexane's predominant dehydrogenation product is toluene ($C_7H_8$) and 2-propanol's predominant dehydrogenation product is acetone (($CH_3)_2CO$).

$$C_7H_{14} \rightarrow C_7H_8 + 3H_2 \quad (1)$$

$$(CH_3)_2CHOH \rightarrow (CH_3)_2CO + H_2 \quad (2)$$

During the primary mode, conditions in the organic hydride system are selected to promote the reverse reactions (i.e., hydrogenation reactions) of (1) and (2) to occur.

The hydrogen reacts with the dehydrogenation product at a catalytic surface 32 in a vapor space 14 of a vessel 16 to form the organic hydride and an exothermic heat of reaction. The vapor space 14 contains a vapor mixture of the organic hydride and its dehydrogenation product in equilibrium with a corresponding liquid mixture in a liquid space 18 of the vessel 16. To maintain equilibrium in the vapor space 14, the liquid mixture is circulated, for example with a pump (not shown), through lines 20 and 22 to the showerheads 24 (valve 26 is closed, valve 28 is open, check valve 30 prevents flow toward the metal hydride system 2).

The catalytic surface 32 may comprise any catalyst that promotes the hydrogenation of the decomposition product and dehydrogenation of the organic hydride. For example, the catalytic surface 32 may comprise Ni, Cr, Co, or platinum family metals, such as Pt, Ru, Rh, Re, Ir, and Pd. Platinum family metals are preferred because they provide favorable operating conditions. The catalytic surface 32 may comprise a single metal or a combination of two or more suitable metals (e.g., Pt/Re or Pt/Ir). Cluster or composite catalysts, especially those that comprise a combination of platinum family metals (e.g., Ru/Rh or Ru/Pt), are especially preferred. The catalytic metal may be supported on a substrate compatible with conditions in the vapor space 14. Suitable substrates include alumina, zirconia, carbon, and other materials. Depending on the requirements of a particular application, the substrate may be a coating on a metal support such as the fins or wall of a heat exchanger, a monolithic structure such as a honeycomb structure, particles disposed in a packed bed, or some other suitable form. These substrates are known in the art. The catalytic surface 32 may be designed and fabricated with conventional techniques. Suitable catalytic metals and substrates may be purchased from commercial suppliers, including Englehard Corporation (Iselin, N.J.), Johnson Mathey, Inc. (Malvern, Penna.), and UOP (Des Plaines, Ill.) or may be custom fabricated for a particular application.

The exothermic heat of reaction generated by hydrogenating the dehydrogenation product at the catalytic surface 32 may be removed by circulating air, water, or any other suitable coolant through a heat exchanger 34. The heat can be used for space heating, some other useful purpose, or merely released to the surroundings. To improve heat transfer, the catalytic surface 32 may have a conventional extended heat transfer surface such as fins, studs, or the like in contact with the heat exchanger 34. Any other conventional heat transfer scheme may be used to remove the exothermic heat of reaction from the vapor space 14. During the hydrogenation reaction, the vapor space 14 should be maintained at a temperature that promotes the desired hydrogenation reaction. The temperature required for the hydrogenation reaction, which may range from about 20° C. to about 200° C., depends on the catalyst, pressure, and decomposition product involved in the reaction. For example, to hydrogenate toluene to methylcyclohexane over a Pt catalyst, the temperature in the vapor space may be kept at less than about 150° C. If the temperature in the vapor space 14 is allowed to rise too high, the favored reaction could become the dehydrogenation reaction, which is undesirable during the cooling mode. The pressure in the vapor space 14 during the cooling mode should be at or above atmospheric pressure. One skilled in the art will know how to select a suitable space velocity for the reaction.

During periods when operation in the primary mode is not required, for example at night or other times when heat is not extracted from the heat source 6, the heat pump may enter a regeneration mode in which the metal hydride in the metal hydride bed 4 is regenerated. During regeneration, the catalytic surface 32 may be heated to a temperature sufficient to endothermically dissociate the organic hydride in the vapor mixture to $H_2$ and the dehydrogenation product. The temperature required for the dehydrogenation reaction, which may range from about 100° C. to about 500° C., depends on the catalyst, pressure, and organic hydride involved in the reaction. For example, if methylcyclohexane is dehydrogenated to toluene over a Pt catalyst, the catalytic surface 32 may be heated to a temperature of at least about 300° C. The endothermic heat of reaction for the dehydrogenation reaction may be supplied though the heat exchanger 34 from any heat source that is at a suitable temperature. For example, the heat may be supplied by burning a fuel such as natural gas, by electric resistance heating, or from any other suitable source. The pressure in the vapor space 14 during the regeneration mode should be at or near atmospheric pressure. One skilled in the art will know how to select a suitable space velocity for the reaction.

Producing $H_2$ in the organic hydride system 12 creates a pressure differential between the organic hydride system 12 and the metal hydride bed 4. As a result, the $H_2$ flows through the duct 10 to the metal hydride bed 4 where it regenerates the metal hydride in an exothermic reaction. The metal hydride bed 4 may be cooled by circulating the liquid mixture through lines 20 and 36 (valve 26 is open, valve 28 is closed). The liquid mixture returns to the organic hydride system through the check valve 30, line 22, and the showerheads 24. Spraying the liquid mixture through the showerheads 24 condenses excess dehydrogenation product and keeps sufficient organic hydride in the vapor space to form $H_2$. Using the liquid mixture to cool the metal hydride bed 4 during regeneration improves the efficiency of the heat pump. Alternately, the metal hydride bed 4 may be cooled by a water loop connected to a hot water system, by using air that will oxidize the fuel burned to supply the endothermic heat of reaction, or by any other cooling system.

Figure 2:
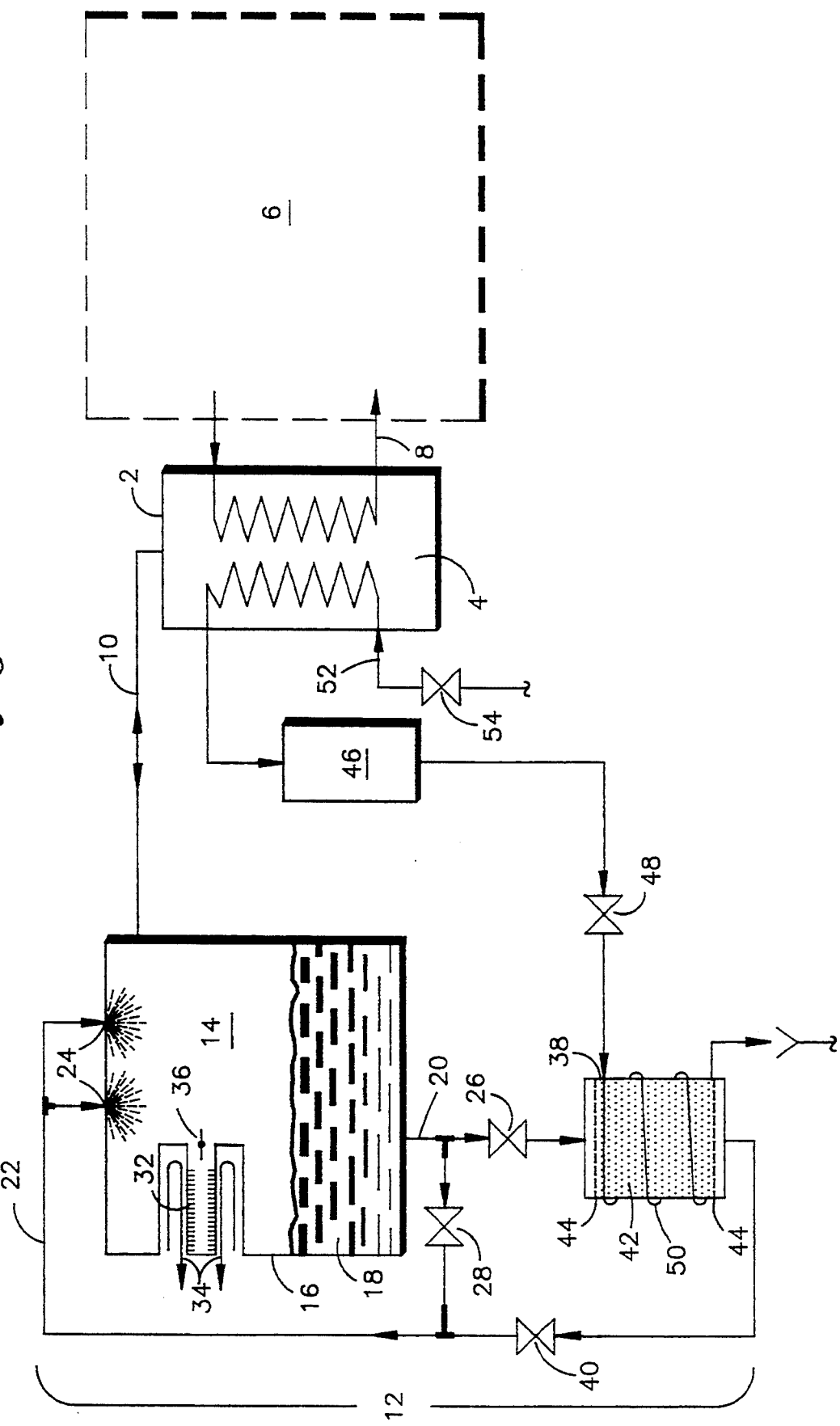
FIG. 2 is a process flow diagram of another heat pump of the present invention configured as a cooling device.

FIG. 2 shows an alternate embodiment of the present invention. In the primary mode, the metal hydride section 2 and organic hydride section 12 function as described above. In the regeneration mode, a valve 36 closes off access to the catalytic surface 32 and the dehydrogenation reaction takes place in a liquid phase reaction zone 38. The valve 36 may be any suitable valve, such as a butterfly valve or gate valve. Alternately, any other conventional device may be used to close off access to the catalytic surface 32.

The liquid mixture flows to the reaction zone 38 (valves 26 and 40 are open, valve 28 is closed) where it contacts a dehydrogenation catalyst 42 suspended in the liquid in the reaction zone. The catalyst 42 may be retained inside the reaction zone 38 with screens 44 or any other comparable device. The dehydrogenation catalyst 42 may be any liquid phase dehydrogenation catalyst known in the art, including any of the catalysts listed above.

Preferably, the catalyst 42 will be a carbon-supported platinum family single metal (particularly Ru and Rh) or composite catalyst (particularly Ru/Rh and Ru/Pt) similar to those described by Yasukazu Saito of the University of Tokyo and his colleagues. Some of these catalysts, for example a 5 wt % Ru/carbon catalyst, may be purchased from commercial suppliers such as N. E. Chemcat Co. A composite catalyst may be made by adsorbing $RuCl_3$ and $RhCl_3$ or $RuCl_3$ and $K_2PTCl_4$ in a suitable atomic ratio of Ru:Rh or Ru:Pt onto activated carbon supports from an aqueous solution at room temperature. The adsorption may take from 6 hr to about 8 hr. For a Ru/Pt catalyst, good results have been reported with Ru:Pt ratios of 4:1, 1:1, and 1:4 and total metal loadings of about 5 wt %. The activated carbon should have a large specific surface area, for example about 2770 $m^2/g$. Such activated carbon is available from Kansai Netsukagaku Co. (Japan). The adsorbed metal chlorides may be reduced to catalytic metals with an aqueous solution of $NaBH_4$ (900 mg/10 ml) by adding the $NaBH_4$ dropwise (about 1 ml/min) to the metal chloride solution. After allowing the metal chloride solution to stand for about 10 min, the carbon supported catalyst may be filtered from the solution, washed with large amounts of water, and dried. The catalyst may be dried under a vacuum at about 50° C. for about 10 hr.

During regeneration, the reaction zone 38 may be heated to a temperature sufficient to endothermically dissociate the organic hydride to $H_2$ and the dehydrogenation product. Dissociation proceeds at low temperatures as long as the $H_2$ decomposition product, in the form of gas bubbles, is permitted to leave the catalyst surface as it forms. Reaction rates are enhanced by temperatures close to the boiling point of the organic hydride. For example, if 2-propanol is dehydrogenated to acetone over a Ru/Pt/carbon catalyst, the reaction zone 38 may be heated to a temperature of about 80° C. One skilled in the art will know how to select a suitable temperature and space velocity for the reaction.

The heat for the dehydrogenation reaction may come from any suitable source by any suitable means. For example, hot water from a hot water tank 46 may be flowed through valve 48 and a heat exchanger 50 to provide the endothermic heat of reaction. The hot water may be from an industrial process or some other source. Alternately, the heat of reaction may be supply by any other conventional means.

As the dehydrogenation reaction proceeds, $H_2$ formed in the reaction bubbles out of the reaction zone 38 through the liquid space 18 into the vapor space 14 where it creates a pressure differential between the organic hydride system 12 and the metal hydride bed 4. As a result, it flows through the duct 10 to the metal hydride bed 4 where it regenerates the metal hydride in an exothermic reaction. The metal hydride bed 4 may be cooled by flowing water through line 52 (valve 54 is open). The water absorbs heat and may flow to the hot water tank 46. Alternately, the metal hydride bed 4 may be cooled by any other conventional method. If desired, the heat removed from the metal hydride bed 4 may be used for space heating or some other purpose.

As the organic hydride in the reaction zone 38 becomes depleted, the liquid in the reaction zone may be returned to the vessel 16 though valve 40, line 22, and showerheads 24. Additional liquid from the liquid space 18 may then be admitted to the reaction zone 38.

Figure 3:
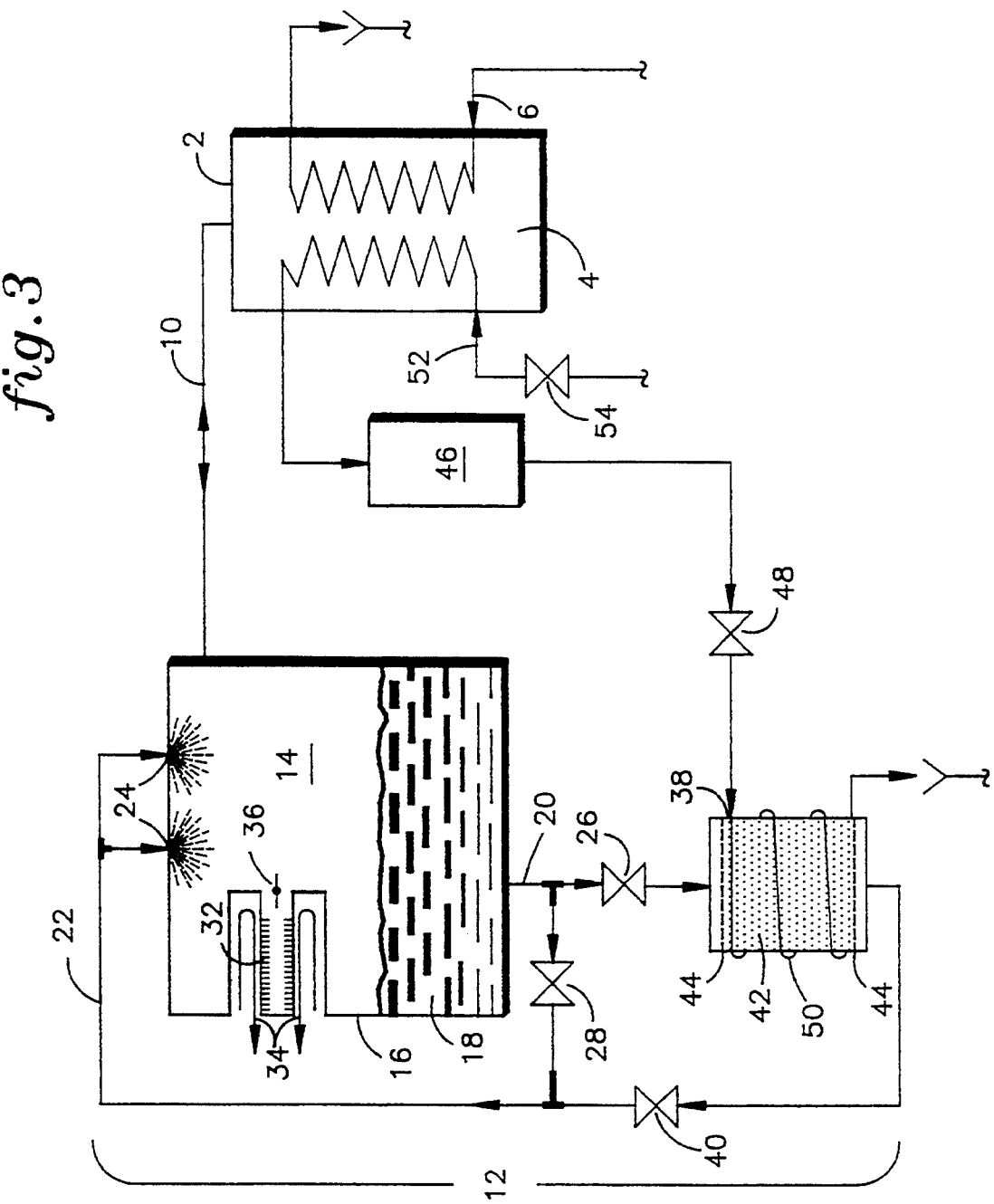
FIG. 3 is a process flow diagram of a heat pump of the present invention configured as a space heating device.

FIG. 3 shows a heat pump of the present invention that is configured as a space heating device. During the primary mode, the metal hydride bed 4 absorbs heat from a heat source 6, such as a hot water stream from an industrial process, and dissociates to form $H_2$. The heat source 6 may be any heat source that contains enough energy to dissociate the metal hydride bed 4. To allow waste heat at relatively low temperatures to be used as the heat source 6, the metal hydride in the bed 4 should preferably dissociate at temperatures between about 35° C. and about 95° C.

After the metal hydride dissociates to form $H_2$, the $H_2$ flows to the vapor space 14 where it reacts with the dehydrogenation product to produce heat as described above. The heat is removed through the heat exchanger 34 and is used for space heating. The amount of heat removed through the heat exchanger 34 is controlled to maintain catalyst surface temperatures of less than about 150° C.

During periods when heating is not required, the metal hydride bed 4 can be regenerated as described above for the embodiment of FIG. 2.

Heat pumps of the present invention provide several benefits over prior art heat pumps. For example, because they have no compressor, they are quieter than prior art devices. The absence of a compressor also reduces the number of moving parts subject to wear and failure. The use of $H_2$ as the working fluid eliminates concerns raised by chlorofluorocarbons.

In addition, the use of two hydride systems, one of which undergoes an exothermic hydrogenation reaction while the other undergoes an endothermic dehydrogenation reaction allows for heat integration when operating in the regeneration mode.

Moreover, the use of a liquid phase dehydrogenation reaction in some embodiments of the present invention allows the use of low grade heat (for example heat at about 80° C.) as an energy source to drive the metal hydride regeneration. The low grade heat also can be the heat source for operation in the primary mode when the heat pump is used for space heating. The use of low grade heat can result in a high coefficient of performance.

The invention is not limited to the particular embodiments shown and described herein. Various changes and modifications may be made without departing from the spirit or scope of the claimed invention.

I claim:

1. A heat pump, comprising:
   (a) an organic hydride system that comprises:
      (i) a vessel having a liquid space and a vapor space,
      (ii) a catalytic surface disposed in the vapor space, wherein the catalytic surface promotes dehydrogenation of an organic hydride to form $H_2$ and hydrogenation of an organic dehydrogenation product to form the organic hydride,
      (iii) means for heating the catalytic surface when the catalytic surface promotes dehydrogenation, and
      (iv) means for cooling the catalytic surface when the catalytic surface promotes hydrogenation,
   (b) a metal hydride system that comprises:
      (i) a metal hydride bed,
      (ii) means for transferring heat from a heat source to the metal hydride bed, and
   (c) a duct connecting the vapor space of the organic hydride system with the metal hydride system.

2. The device of claim 1, further comprising means for circulating a liquid mixture that comprises the organic hydride through the metal hydride system to remove heat from the metal hydride bed.

3. The device of claim 1, wherein the catalytic surface comprises Ni, Cr, Co, Pt, Ru, Rh, Re, Ir, or Pd.

4. The device of claim 1, wherein the organic hydride comprises a hydrocarbon or alcohol.

5. The device of claim 4, wherein the organic hydride comprises up to about 14 carbon atoms.

6. The device of claim 5, wherein the organic hydride comprises methylcyclohexane or 2-propanol.

7. The device of claim 1, wherein the metal hydride dissociates to hydrogen at a temperature above about 10° C.

8. The device of claim 7, wherein the metal hydride comprises La or Ni.

9. A heat pump, comprising:
   (a) an organic hydride system that comprises:
      (i) a vessel having a liquid space and a vapor space,
      (ii) a catalytic surface disposed in the vapor space, wherein the catalytic surface promotes hydrogenation of an organic dehydrogenation product to form an organic hydride,
      (iii) means for cooling the catalytic surface when the catalytic surface promotes hydrogenation,
      (iv) a liquid-phase reaction zone in fluid communication with the liquid space,
      (v) a dehydrogenation catalyst disposed in the reaction zone, wherein the dehydrogenation catalyst promotes dehydrogenation of the organic hydride to form $H_2$,
      (vi) means for providing an endothermic heat of reaction to the reaction zone, and
      (vii) means for transporting $H_2$ from the reaction zone to the vapor space,
   (b) a metal hydride system that comprises:
      (i) a metal hydride bed,
      (ii) means for transferring heat from a heat source to the metal hydride bed,
      (iii) means for circulating a liquid mixture that comprises the organic hydride through the metal hydride system to remove heat from the metal hydride bed, and
   (c) a duct connecting the vapor space of the organic hydride system with the metal hydride system.

10. The device of claim 9, wherein the catalytic surface comprises Ni, Cr, Co, Pt, Ru, Rh, Re, Ir, or Pd.

11. The device of claim 9, wherein the dehydrogenation catalyst comprises a carbon support and at least one of Pt, Ru, Rh, Re, Ir, or Pd disposed on the carbon support.

12. The device of claim 9, wherein the organic hydride comprises a hydrocarbon or alcohol.

13. The device of claim 12, wherein the organic hydride comprises up to about 14 carbon atoms.

14. The device of claim 13, wherein the organic hydride comprises methylcyclohexane or 2-propanol.

15. The device of claim 9, wherein the metal hydride dissociates to hydrogen at a temperature above about 10° C.

16. The device of claim 15, wherein the metal hydride comprises La or Ni.

17. A method of cooling a heat source with a heat pump that includes a metal hydride system and an organic hydride system, comprising the step of:
   (a) operating the device in a primary mode that comprises:
      (i) transferring heat from a heat source to a metal hydride bed, thereby cooling the heat source and decomposing a metal hydride in the bed to form $H_2$, (ii) flowing the $H_2$ to a vapor space in a liquid hydride system, and (iii) reacting the $H_2$ with a dehydrogenation product at a catalytic surface in the vapor space to form an organic hydride and an exothermic heat of reaction.

18. The method of claim 17, wherein the heat source is a conditioned space.

19. The method of claim 17, wherein the exothermic heat of reaction is removed from the vapor space and used for space heating.

20. The method of claim 17, wherein the metal hydride dissociates to hydrogen at a temperature above about 10° C.

21. The method of claim 20, wherein the metal hydride comprises La or Ni.

22. The method of claim 17, wherein the dehydrogenation product comprises a dehydrogenation product of a hydrocarbon or alcohol.

23. The method of claim 22, wherein the dehydrogenation product comprises up to about 14 carbon atoms.

24. The method of claim 23, wherein the dehydrogenation product comprises toluene or acetone.

25. The method of claim 17, wherein the catalytic surface comprises Ni, Cr, Co, Pt, Ru, Rh, Re, Ir, or Pd.

26. The method of claim 17, further comprising the step of:

(b) operating the device in a regeneration mode that comprises:

(i) supplying an endothermic heat of reaction to the catalytic surface, thereby dehydrogenating the organic hydride to form $H_2$, (ii) flowing the $H_2$ to the metal hydride bed, and (iii) reacting the $H_2$ with the metal hydride bed to regenerate the metal hydride and produce an exothermic heat of reaction.

27. The method of claim 26 wherein the organic hydride is dehydrogenated at a temperature between about 100° C. and about 500° C.

28. The method of claim 26, wherein the exothermic heat of reaction is removed from the metal hydride bed with liquid organic hydride.

29. The method of claim 17, further comprising the step of:

(b) operating the device in a regeneration mode that comprises:

(i) flowing a liquid mixture that comprises the organic hydride into a reaction zone that includes a dehydrogenation catalyst, (ii) supplying an endothermic heat of reaction to the reaction zone, thereby dehydrogenating the organic hydride to form $H_2$, (iii) flowing the $H_2$ to the metal hydride bed, and (iv) reacting the $H_2$ with the metal hydride bed to regenerate the metal hydride and produce an exothermic heat of reaction.

30. The method of claim 29, wherein the dehydrogenation catalyst comprises a carbon support and at least one of Pt, Ru, Rh, Re, Ir, or Pd disposed on the carbon support.

31. The method of claim 29, where in the organic hydride is dehydrogenated at a temperature of about the boiling point of the organic hydride.

* * * * *